Nov. 7, 1933.  O. WITTEL  1,933,782

MOTION PICTURE CAMERA

Filed Jan. 21, 1931  2 Sheets-Sheet 1

Inventor
Otto Wittel,
By
Attorneys

Nov. 7, 1933.　　　　　O. WITTEL　　　　　1,933,782
MOTION PICTURE CAMERA
Filed Jan. 21, 1931　　　2 Sheets-Sheet 2

Inventor
Otto Wittel,
By Donald H. Stewart,
Newton M. Perrin
Attorneys

Patented Nov. 7, 1933

1,933,782

UNITED STATES PATENT OFFICE 1,933,782

MOTION PICTURE CAMERA

Otto Wittel, Rochester, N. Y., assignor to Eastman Kodak Company, Rochester, N. Y., a corporation of New York Application January 21, 1931. Serial No. 510,088

8 Claims. (Cl. 88—17)

This invention relates to photography and more particularly to motion picture cameras particularly adapted for use in taking small pictures for amateur use. One object of my invention is to provide a camera which may be extremely small and light in weight. Another object of my invention is to provide a camera which is very thin and which may be readily slipped into a pocket or other convenient receptacle. Another object of my invention is to provide a camera having relatively smooth exterior walls free from projections and extensions. Another object of my invention is to provide a camera of the type described with a pair of film supporting reels arranged substantially in a plane and providing a camera mechanism which permits the film to be looped from one film reel to another in a series of loops, the bulky parts of the mechanism being arranged within the loops of film. Another object of my invention is to provide extremely light and compact film driving mechanism including a sprocket which may totally or partially enclose a power spring for driving the sprocket. Still another object of my invention is to provide a partition plate in a camera close to one wall of the camera to provide a relatively narrow space in which the belts, gearing and other operable connection between the relatively movable parts can be placed to form a compact structure and other objects will appear from the following specification, the novel features being particularly pointed out in the claims at the end thereof.

Coming now to the drawings wherein like reference characters denote like parts throughout:

In amateur motion picture cameras using a small sized film it is desirable to produce a camera with the smallest possible bulk and one which is free from any exterior projections or extensions so that the camera may be readily carried. The camera must, of course, be of greater width than the film which passes through it. With most of the well known type cameras now on the market the cameras are actually a good many times the width of the film used therein since it has been customary to place the film reels and film sprocket in one chamber and the other power drive for these parts in another chamber and occasionally the connecting mechanism by which the parts are operated in still another part of the camera.

In accordance with my invention I have provided a plurality of film guides for looping the film with a series of loops through the camera and arranging the bulky parts of the camera mechanism so as to project into the film loops without in any way obstructing the path through which the film may pass.

Figure 1:
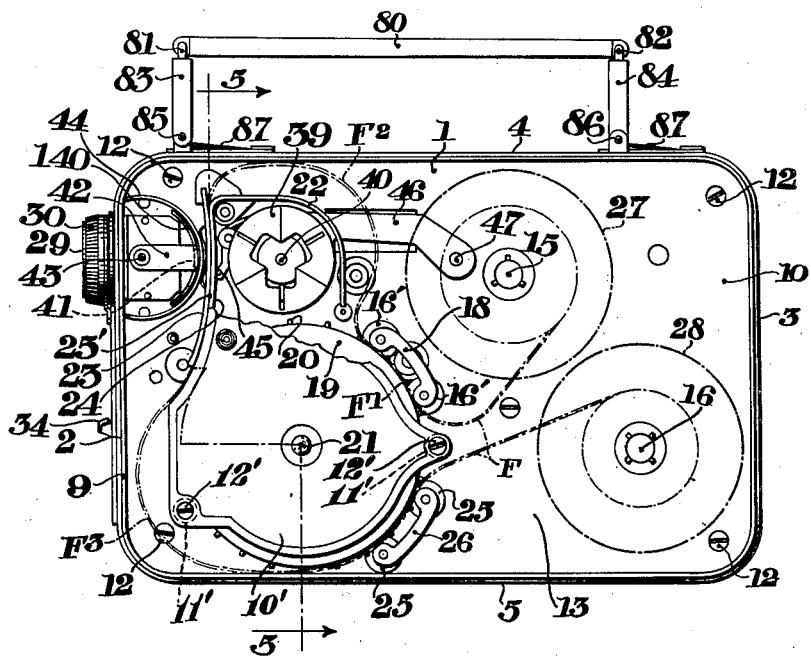
Fig. 1 is a side elevation of a camera, with a door removed constructed in accordance with and embodying a preferred form of my invention.

As a preferred embodiment of my invention I have illustrated a compact light camera which as shown in Fig. 1 may consist of a casing in the form of shallow box designated broadly as 1 having a front wall 2, rear wall 3, top wall 4 and bottom wall 5.

Each of these walls extends from a side wall 6 leaving an opened side which may be closed by means of a cover 7 having a flange 8 which engages in a rabbet 9 extending around the periphery of the opening.

Figure 2:
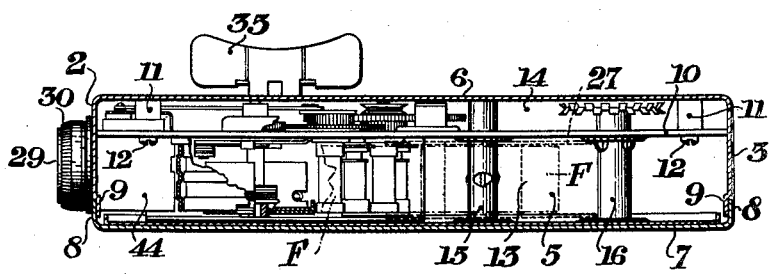
Fig. 2 is a section through the camera shown in Fig. 1 and illustrating the two main camera compartments.

I find it convenient to provide a partition wall or support 10 which is spaced a relatively short distance from wall 6 of the camera casing as best shown in Fig. 2 by means of a plurality of posts 11 of which with the screws 12 hold the partition plate in place. This partition plate divides the camera into two compartments 13 and 14.

Compartment 13 preferably is provided with a pair of film reel hubs 15 and 16 and these may be carried by the partition plate 10. As indicated in my copending application Serial No. 472,678, filed August 2, 1930, I may provide these posts with special configurations adapted to control the location of the film spools on the posts insuring the proper loading of the machine.

Post 15 normally carries a supply reel of film and post 16 normally carries a take-up reel, and post 16 is a driven post which winds film on a reel carried thereon.

From a reel 27 on post 15 the film F is led past a plurality of film guides here shown as a pair of rollers 16' which may be mounted on a yoke 18 and which are adapted to hold a loop of film F1 upon a sprocket 19. Sprocket 19 has a plurality of teeth 20 on the periphery thereof and is mounted to turn upon an axle 21. A face plate 10' is located in spaced relation to mechanism plate 10 and is so positioned by means of a plurality of sleeves 11' and bolts 12' which are screwed in the mechanism plate 10. Mechanism plate 10 and face plate 10' form bearings for axle 21 which has a handle 35 attached to one end thereof. From guide rollers 16' the film is looped at F2 about a fixed film guide 22 from which it may pass between a movable gate member 23 and a relatively fixed gate member 24, these gate members being preferably longitudinally curved in accordance with well known construction.

From the gate 25' which is composed of the gate members 23 and 24 the film is looped at F3 and passes around another portion of the sprocket 19 in contact wtih a pair of guide rollers 25 carried by the bracket 26 and thence to the take-up reel 28 which is similar to the supply reel 27 on shaft 15.

It will thus be seen that the film passes through a curved path from the supply reel 28 to the take-up reel 27 being passed through a series of loops through the camera chamber 13.

The camera may be provided with an objective having a mount 29 here shown as of the focusing type although, of course, any desired type of objective may be used. The objective mount 29 may be p.ovided with suitable knurling 30 for altering the focus of the objective and suitable scales may be employed, such a scale being indicated at 32 on Fig. 3, a pointer 33 being provided on the objective mount for cooperating with the scale.

The camera may also be provided with a trigger 34 which may control the power drive of the camera, and with a handle 35 which is adapted to wind up and place under tension a spring 36 which is enclosed in the camera.

I have found that the spring 36 can be attached to the shaft 21 and to a housing composed of a pair of telescoping cup-shaped members 37 and 38, member 38 being preferably the member forming the outside of the sprocket and having the teeth 20 formed on an edge thereof. As will appear from Fig. 5 the spring which drives this camera is at least partially enclosed by the sprocket 19, thus space which might otherwise go to waste has been utilized to materially reduce the size of the camera. It should be noted that the sprocket 19 lies within a loop of the film.

In order to control the spring movement a governor 39 is provided on a shaft 40, the governor itself forms the subject matter of another copending application, Serial No. 499,940, filed December 4, 1930, but in that application the relation of the governor to the remaining mechanism is not particularly disclosed. In this application it is the location of the governor and not the structure of the governor per se which is important.

Guard 22 forms one of the plurality of film guides which directs the film F through a series of loops, one of these loops F2 passes around the guard 22 so that the governor 39 may lie partially or wholly within a film loop. This also contributes to the compactness of my camera.

The camera shutter consists of a curved plate 140 having an aperture 41 in the center and being adapted to oscillate upon an arm 42 pivoted at 43 to support, the entire shutter being normally enclosed in an arcuate shaped housing 44 as shown in Fig. 2. This shutter can be rocked back and forth by any desired mechanism to make the exposures. As shown in the present application the shutter pivots 43 and 43' are mounted to each side of the objective 29 and the shutter itself oscillates behind the objective, the pivoted point being normally in front of the objective. Pivot 43' extends through plate 10 as will be hereinafter more fully described.

Figure 4:
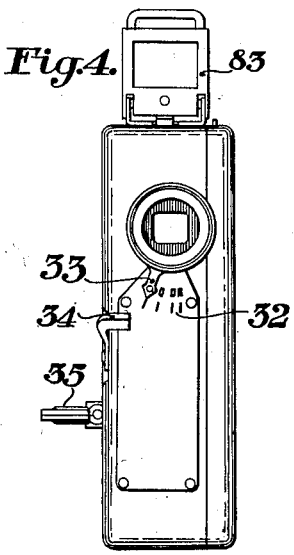
Fig. 4 is a front elevation of the camera shown in Fig. 1.

The film may be intermittently moved past the film gate by means of a claw type of pulldown 45, this claw being carried by arm 46 pivoted at 47 to the partition plate 10 and being adapted to be oscillated by the shaft 40 as is fully shown in Fig. 4 of my copending application last referred to.

Figure 3:
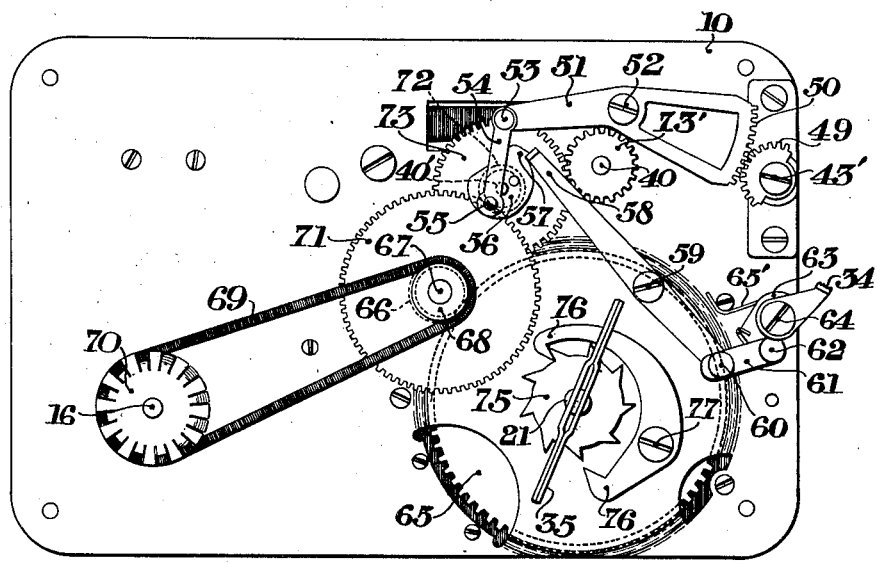
Fig. 3 is a side elevation of the connections between operative parts of the camera and the mechanism plate which carries these parts removed from the camera.

From Fig. 3 the operable connections lying within chamber 14 are clearly shown. The shutter plate 140 as above described is mounted upon pivots 43 and 43', the last mentioned pivot extending through plate 10 and supporting the gear segment 49. This gear segment meshes with a second gear segment 50 carried by an arm 51 pivoted at 52 to plate 10 and at 53 to a crank 54 which is rocked by means of a pivot 55 extending up from a stop plate 56.

Plate 56 is provided with a hook-shaped stop 57 which may be engaged by an arm 58 pivoted at 59 to plate 10 and at 60 to a link 61 pivotally connected at 62 to a plate 63 supporting a stud 64 upon which the trigger 34 is mounted. A spring 65' normally holds the trigger in the position shown but pressure upon the trigger removes the end of arm 58 from plate 56 permitting this plate to rotate under the power of a spring 36.

Figure 5:
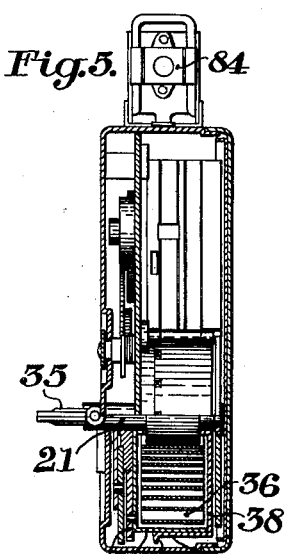
Fig. 5 is a section on line 5—5 of Fig. 1.

The spring 36 drives the spring casing composed of sections 37 and 38, the former supporting a gear 65 as best shown in Figs. 3 and 5. Gear 65 through gear 66 drives a shaft 67 carrying the pulley 68 over which a belt 69 passes, this belt engaging and driving a pulley 70 which transmits motion to the shaft 16. This is the shaft on which reel 28 is mounted to wind up the film.

Shaft 67 also supports a gear 71 meshing with a smaller gear 72 which is coaxially arranged on shaft 40' with gear 73 and the plate 56. Gear 73 meshes with a second gear 73' on shaft 40 this being the shaft which operates the pulldown claw 45 and the governor 39. The shutter 140 is operated through shaft 40' driven by gear 73.

The handle 35 is provided with a ratchet 75 and a pawl 76 pivoted at 77 to the plate 10. It will thus be seen that all of the connecting mechanism for operating the movable parts is contained in compartment 14 of the camera which is a narrow compartment taking up very little space. The bulky camera parts such as the sprocket 19 and the governor 39 are mounted at least partially in compartment 13 and the film F is looped about these bulky parts. The shaft which carries gears 72, 73 and plate 56 is shaft 40', and shaft 40 is operated through shaft 40' by gears 73 and 73'. Shaft 40 operates the governor and pulldown claw, the latter being more fully pointed out in a copending application above referred to.

If desired, the camera may be provided with a handle 80 carried by a pair of links 81 and 82, the former being attached to a front camera finder frame 83 and the latter being attached to a rear camera finder element 84, each of these two elements being pivoted at 85 and 86 to the camera casing and being preferably provided with similar latching mechanisms 87 by which the handle may be held flat against the camera body.

From the specification it will be seen that I have provided an unusually compact camera as the camera is not much wider than the film which it is adapted to take. Compartment 13 is only slightly wider than the film and compartment 14 is of much less width than compartment 13. This is made possible by the arrangement of the bulky parts inside of the film loops and particularly the combined sprocket and spring casing which effects a great saving of space.

Having thus described my invention what I claim and desire to secure by Letters Patent is:—

1. In a motion picture apparatus, the combination with a means for maintaining preformed loops in a film and including a sprocket, and an intermittent film advancing mechanism in co-operative relation to said sprocket and adapted intermittently to move the film through said loops, of a power spring located within said sprocket for rotating the same continuously.

2. In a motion picture apparatus, the combination with a means adapted to engage spaced portions of a film for maintaining preformed loops therein and including a sprocket, and an intermittent film advancing mechanism in co-operative relation to said sprocket and adapted intermittently to move the film through said loops, of a power spring located within said sprocket for rotating the same continuously.

3. In a motion picture apparatus, the combination with a sprocket and an intermittent film advancing mechanism in co-operative relation to said sprocket, both being adapted to engage a film and to maintain unsupported loops in said film, of a power spring located within said sprocket for rotating the same continuously.

4. In a motion picture apparatus, the combination with a sprocket adapted to engage a film and to maintain unsupported loops in said film, an intermittent film advancing mechanism in co-operative relation to said sprocket and adapted intermittently to engage said film and to advance the film through said loops, and a centrifugal governing means also in co-operative relation to said sprocket and located to be at least partially encircled by said loops, of a power spring located within said sprocket for rotating the same continuously.

5. In a motion picture apparatus, the combination with a casing adapted to contain two rolls of film, a sprocket adapted to engage the film leaving one film roll and the film moving to the other film roll and adapted to maintain a preformed loop in the intermediate portion of said film, and a film advancing mechanism in co-operative relation to said sprocket and adapted intermittently to engage said film and move the film through said loop, of a power spring located within said sprocket for continuously rotating the same.

6. In a motion picture apparatus, the combination with a mechanism plate therein, a means for maintaining preformed loops in a film and including a sprocket which is rotatably and entirely supported by said mechanism plate, and an intermittent film advancing mechanism in co-operative relation to said sprocket and adapted intermittently to engage and move the film through said loops, of a power spring located within said sprocket for rotating the same continuously.

7. In a motion picture apparatus, the combination with a mechanism plate therein, a face plate mounted upon said mechanism plate in spaced relation thereto, a means for maintaining preformed loops in a film and including a sprocket which is rotatably supported between said mechanism plate and said face plate, and an intermittent film advancing mechanism in co-operative relation to said sprocket and adapted intermittently to engage and move the film through said loops, of a power spring located within said sprocket for rotating the same continuously.

8. In a motion picture apparatus, the combination with a mechanism plate therein, a sprocket comprising a cylindrical casing journaled on said mechanism plate and having a plurality of peripheral teeth which are adapted to engage spaced portions of a film and to maintain preformed loops in said film, and an intermittent film advancing mechanism in co-operative relation to said sprocket and adapted intermittently to engage and move the film through said loops, of an axle extending into said cylindrical casing, and a power spring within said cylindrical casing, having one end attached to said casing and the other end attached to said axle.

OTTO WITTEL.